United States Patent
Zenuni et al.

(10) Patent No.: US 10,847,926 B2
(45) Date of Patent: Nov. 24, 2020

(54) HOUSING LID FOR A FIELD DEVICE OF AUTOMATION TECHNOLOGY FOR WIRELESS TRANSMISSION OF INFORMATION

(71) Applicant: Endress+Hauser SE+Co. KG, Maulburg (DE)

(72) Inventors: Armend Zenuni, Lörrach (DE); Philipp Reichert, Schopfheim (DE); Harald Schäuble, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/083,954

(22) PCT Filed: Mar. 14, 2017

(86) PCT No.: PCT/EP2017/055983
§ 371 (c)(1),
(2) Date: Sep. 11, 2018

(87) PCT Pub. No.: WO2017/162484
PCT Pub. Date: Sep. 28, 2017

(65) Prior Publication Data
US 2019/0221961 A1   Jul. 18, 2019

(30) Foreign Application Priority Data

Mar. 22, 2016 (DE) .................. 10 2016 105 362

(51) Int. Cl.
*H01R 13/52* (2006.01)
*G05B 9/02* (2006.01)
(Continued)

(52) U.S. Cl.
CPC .......... *H01R 13/5213* (2013.01); *G05B 9/02* (2013.01); *H01R 13/527* (2013.01);
(Continued)

(58) Field of Classification Search
CPC   H01R 13/5213; H01R 13/527; H01R 13/622; H04W 4/80; G05B 9/02;
(Continued)

(56) References Cited

U.S. PATENT DOCUMENTS 6,366,436 B1 * 4/2002 Maier .................. G01F 15/06
361/93.9
6,701,287 B2 * 3/2004 Nagase ............. G05B 19/0423
702/188
(Continued)

FOREIGN PATENT DOCUMENTS

CA   2902518 A1   2/2016
CN   1950770 A    4/2007
(Continued)

OTHER PUBLICATIONS

Search Report for German Patent Application No. 10 2016 105 362.7, German Patent Office, dated Feb. 22, 2017, 9 pp.
(Continued)

*Primary Examiner* — Oscar C Jimenez
(74) *Attorney, Agent, or Firm* — Kelly J. Smith; Endress+Hauser (USA) Holding Inc.

(57) ABSTRACT

The invention relates to a housing lid for a field device comprising a screw thread, a receiving and transmitting unit, a battery unit, and a communication interface. The screw thread secures the housing lid to the field device. The receiving and transmitting unit is embodied wirelessly to receive information produced by at least one external unit and to transmit information produced by the field device to the external unit. The battery unit supplies the receiving and transmitting unit and/or the field device with electrical energy. The communication interface is in electrical contact
(Continued)

with the battery unit, with the receiving and transmitting unit and via a corresponding communication interface of the field device with the field device.

13 Claims, 2 Drawing Sheets

(51) Int. Cl.
    *H01R 13/622*     (2006.01)
    *H04W 4/80*     (2018.01)
    *H04L 29/08*     (2006.01)
    *H01R 13/527*     (2006.01)
    *H04Q 9/00*     (2006.01)

(52) U.S. Cl.
    CPC ......... *H01R 13/622* (2013.01); *H04L 67/125* (2013.01); *H04Q 9/00* (2013.01); *H04W 4/80* (2018.02); *G05B 2219/24028* (2013.01); *G05B 2219/25428* (2013.01); *G05B 2219/33192* (2013.01); *H04L 67/12* (2013.01); *H04Q 2209/40* (2013.01); *H04Q 2209/43* (2013.01); *H04Q 2209/88* (2013.01)

(58) Field of Classification Search
    CPC ........... G05B 2213/24028; G05B 2213/25428; G05B 2213/33192; H04L 67/125; H04Q 2209/43; H04Q 2209/88
    USPC ................................................... 439/186, 320
    See application file for complete search history.

(56) References Cited

U.S. PATENT DOCUMENTS

| | | | | |
|---|---|---|---|---|
| 6,863,552 B1* | 3/2005 | Katwala | ............... | H01R 13/622 439/320 |
| 7,885,610 B2* | 2/2011 | Isenmann | ........... | H04L 12/4625 340/572.1 |
| 2002/0120422 A1* | 8/2002 | Nagase | ............... | G05B 19/0423 702/127 |
| 2005/0245291 A1* | 11/2005 | Brown | ............... | G05B 19/4185 455/572 |
| 2007/0279173 A1* | 12/2007 | Scholz | ................ | G01D 11/245 336/107 |
| 2008/0274772 A1* | 11/2008 | Nelson | ................ | H01M 2/1055 455/572 |
| 2009/0253388 A1 | 10/2009 | Kielb et al. | | |
| 2009/0311975 A1* | 12/2009 | Vanderaa | ............. | G01D 11/245 455/90.3 |
| 2010/0257930 A1* | 10/2010 | Isenmann | ............. | G01F 23/296 73/273 |
| 2013/0141217 A1* | 6/2013 | Goren | ...................... | G06K 7/01 340/10.1 |
| 2013/0278222 A1* | 10/2013 | Seiler | ...................... | H01M 2/34 320/135 |
| 2017/0078769 A1* | 3/2017 | Theberge | ................ | H04Q 9/00 |
| 2017/0251289 A1* | 8/2017 | Ebeling | ................ | H04R 1/028 |
| 2018/0083393 A1* | 3/2018 | Kobayashi | ............... | H01H 9/54 |
| 2018/0202407 A1* | 7/2018 | Harvey | ................ | H05K 1/181 |

FOREIGN PATENT DOCUMENTS

| | | |
|---|---|---|
| CN | 101765954 A | 6/2010 |
| CN | 102066880 A | 5/2011 |
| CN | 102067051 A | 5/2011 |
| DE | 10309886 A1 | 9/2003 |
| DE | 102008043199 A1 | 4/2010 |
| DE | 102014110385 A1 | 1/2016 |
| WO | 2005103851 A1 | 11/2005 |

OTHER PUBLICATIONS

Search Report for International Patent Application No. PCT/EP2017/055983, WIPO, dated May 29, 2017, 13 pp.

* cited by examiner

HOUSING LID FOR A FIELD DEVICE OF AUTOMATION TECHNOLOGY FOR WIRELESS TRANSMISSION OF INFORMATION

CROSS-REFERENCE TO RELATED APPLICATIONS

The present application is related to and claims the priority benefit of German Patent Application No. 10 2016 105 362.7, filed on Mar. 22, 2016 and International Patent Application No. PCT/EP2017/055983, filed on Mar. 14, 2017 the entire contents of which are incorporated herein by reference.

TECHNICAL FIELD

The invention relates to a housing lid for a field device of automation technology for wireless transmission of information.

BACKGROUND

Known from the state of the art are field devices used in industrial plants. Field devices are often applied In process automation technology, as well as in manufacturing automation technology. Referred to as field devices are, in principle, all devices, which are applied near to the process and which deliver, or process, process relevant information. Field devices are used for registering and/or influencing process variables. Serving for registering process variables are measuring devices utilizing sensors. These are used, for example, for pressure- and temperature measurement, conductivity measurement, flow measurement, pH measurement, fill level measurement, etc., which register the corresponding process variables, pressure, temperature, conductivity, pH-value, fill level, flow, etc. Used for influencing process variables are actuators. These are, for example, pumps or valves, which can influence the flow of a liquid in a tube or pipe or the fill level in a container. In addition to the above measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected with superordinated units via communication networks, such as, for example, fieldbusses (Profibus®, Foundation® Fieldbus, HART®, etc.). Normally, the superordinated units are control systems, or control units, such as, for example, a PLC (programmable logic controller). The superordinated units serve, among other things, for process control, process visualizing, process monitoring as well as for start-up of the field devices. The measured values registered by the field devices, especially their sensors, are transmitted via the particular bus system to a (or, in given cases, a number of) superordinated unit(s). Along with that, also data transmission from the superordinated unit via the bus system to the field devices is required, especially for configuring and parametering field devices as well as for operating actuators.

Besides a wired data transmission between the field devices and the superordinated unit, data transmission can also occur wirelessly. Especially, wireless data transmission via radio is provided for in the bus systems, Profibus®, Foundation Fieldbus® and HART®. Radio, or wireless, networks for sensors are specified in detail in the standard IEEE 802.15.4.

For implementing wireless data transmission, newer field devices, especially sensors and actuators, are embodied as radio field devices, in given cases as autarkic radio field devices. These have, as a rule, a wireless communication interface and an electrical current source as integral components. In such case, the wireless communication interface and the electrical current source can be provided in the field device or in a radio unit connected durably to the field device. The electrical current source enables an autarkic energy supply of the field device.

Along with that, there is the option of turning field devices without internal wireless communication interfaces—thus the installed base—into radio-field devices by coupling them with at least one radio unit. A corresponding radio unit is described, for example, in the publication, WO 2005/103851 A1. The radio unit is, as a rule, connected releasably to a communication interface of the field device. Via this communications interface, the field device can transfer the data to be transferred via the bus system to the radio unit, which then transmits the data via radio to the intended location. Conversely, the radio unit can receive data via radio and forward such via the communications interface to the field device. The supplying of the field device with electrical power occurs then, as a rule, via an energy supply unit of the radio unit.

A corresponding radio unit, which supports the wireless HART® protocol, is produced and sold by the Endress+Hauser group under the designation, DVA70.

The electrical current supply of the radio unit is, in such case, as a rule, accomplished via a battery. The replacement of a battery is especially critical in explosion-endangered environments, since the housing of the radio unit must, as a rule, be opened. Also, the retrofitting of older field devices is difficult, since, in given cases, the connectors of the radio unit and the field device are not compatible with one another. Furthermore, the connection between the radio unit and the field device is mechanically weak, whereby in the case of unintentional forces acting on the radio unit a disconnecting of the radio unit from the field device can occur.

SUMMARY

Based on the above, an object of the invention, is a housing lid, which enables equipping a field device in simple manner with a wireless communication capability, as well as providing a mechanically stable connection with the field device.

The object is achieved by a housing lid for a field device of automation technology for wireless transmission of information, comprising a screw thread, a receiving- and transmitting unit, a battery unit and a communication interface,
wherein the screw thread is embodied and arranged on the housing lid in such a manner that the housing lid is securable to the field device by means of the screw thread,
wherein the receiving- and transmitting unit is embodied wirelessly to receive information produced by at least one external unit and to transmit information produced by the field device to the external unit,
wherein the battery unit is embodied to supply the receiving- and transmitting unit and/or the field device with electrical energy,
wherein the communication interface of the housing lid is in electrical contact with the battery unit, with the receiving- and transmitting unit and via a corresponding communication interface of the field device with the field device, and wherein the communication interface of the housing lid is embodied to exchange information between the receiving- and transmitting unit and the field device via the communication interface and the corresponding communication interface of the field device and to transfer electrical energy between the communication interface of the housing lid and the corresponding communication interface of the field device.

The housing lid of the invention offers a series of advantages compared with known solutions. Embodiment in the form of a housing lid of a field device enables retrofitting all types of field devices with a wireless communication capability by replacing the conventional housing lid of the field device with the housing lid of the invention. Solely the dimensions of the screw thread must be matched to that of the field device type of interest. The connection of the housing lid is, moreover, mechanically very robust because of the utilized screwed connection.

The receiving- and transmitting unit can especially be an antenna. Depending on radio standard-, or radio protocol, via which information should be exchanged, the radio unit can also be embodied as a coil, for example, in case NFC or RFID is used.

The external unit can be, for example, a router, for example, in the form of a gateway. Alternatively, the external unit can be another wireless communication capable field device or a computer unit. The computer unit, which is embodied, for example, for configuring and/or parametering the field device by means of wireless communication, can be, for example, a stationary computer unit, for example, a service PC or even a mobile computer unit, especially a mobile end device, such as a smart phone or a tablet.

The transmitted information is especially information produced by the field device, such as, for example, process measured values or diagnostic data. The received information is especially information in the form of control commands or configuration/parametering commands.

In an especially preferred embodiment of the housing lid of the invention, it is provided that the housing lid has a closure component, which closes the housing lid at an end region of the housing lid facing the field device and wherein on the closure component at least one opening is provided, via which the communication interface of the housing lid is electrically contactable with the corresponding communication interface of the field device. Because of the opening, the housing lid does not have to be opened, in order to electrically contact the communication interface of the housing lid with the corresponding communication interface of the field device.

The closure component can, in such case, be embodied cup shaped. Via a snap fit mechanism, the closure component can be secured durably on the end region of the housing lid facing the field device.

In a first variant of the housing lid of the invention, it is provided that the closure component is cast or potted with the housing lid in such a manner that the housing lid is suitable for use in an explosion endangered environment. In an explosion endangered environment, for example, in an environment with ignitable gases, there can, as a result of the casting or potting, be no arcing to ignite the gases, since the interior of the housing lid, especially the battery unit, cannot come in contact with the gases. As additional protection, a protection circuit can be provided, which is arranged between the communication interface of the housing lid and the battery unit. This limits the maximum available electrical current flow to the communication interface in such a manner that an ignition of the gases is not possible.

In the case of a needed battery change, the entire cast or potted housing lid can be replaced. In such case, it is provided that the replacement of the housing lid in an explosion endangered environment is possible, because in the securing and releasing of the housing lid no arcing occurs at the communication interface of the housing lid, or at the corresponding housing interface of the field device, or at its contacts, which are embodied as spring contact pins or plug contacts.

In an advantageous embodiment of the housing lid of the invention, it is provided that the communication interface of the housing lid or the corresponding communication interface of the field device has at least one spring contact or a plug contact for contacting the communication interface of the housing lid with the corresponding communication interface of the field device, which contact is led through the opening of the closure component and protrudes out from the closure component. This is especially advantageous, because the device lid does not have to be opened for connection with a field device. The connection can be made reliably in simple and fast manner.

In an advantageous, further development of the housing lid of the invention, at least one cable connection is provided, which is led through the opening of the closure component and which connects the communication interface of the housing lid with the communication interface of the field device. Especially, field devices, whose corresponding communication interface is not arranged in the vicinity of the housing lid, can be electrically contacted thereby in simple manner with the housing lid.

In a second variant of the housing lid of the invention, it is provided that the battery unit is composed of a battery and a battery holder and that the battery and the battery holder are potted. In this case, the closure component is not cast or potted with the housing lid. The battery unit can, when required, be replaced in simple manner. The potting of the battery unit prevents arcing, whereby a safe application of the housing lid of the invention in an explosion-endangered region is assured.

In an advantageous, further development of the housing lid of the invention, an electronics for control of the receiving- and transmitting unit is provided in the housing lid. Such electronics is supplied with electrical energy from the battery unit or from the field device and is in electrical contact with the corresponding communication interface of the field device and the receiving- and transmitting unit. This is especially advantageous when the field device is an older example, whose electronics is not suitable for conforming to a wireless protocol. The electronics in the housing lid can perform the converting of the information to be transmitted to conform to a wireless protocol, and evaluate received information and forward it to the field device.

In an alternative further development of the housing lid of the invention, an electronics for control of the receiving- and transmitting unit is provided in the field device. Such electronics is supplied with electrical energy from the battery unit or from the field device and is in electrical contact with the corresponding communication interface of the field device.

In a preferred further development of the housing lid of the invention, an interaction/display element is provided in the housing lid for interacting with the field device and/or for display of field device relevant information, wherein the interaction/display element is supplied with electrical energy from the battery unit or from the field device. The display function is preferably provided by a display unit. Interaction with the field device occurs especially via a touch sensitive display or via input elements such as buttons or keys, which are placed on the interaction/display element.

In an advantageous, further development of the housing lid of the invention, it is provided that the housing lid is manufactured at least partially of a metal material. The application of a metal material assures a high mechanical robustness and good electromagnetic shielding.

An advantageous embodiment of the housing lid of the invention provides that the receiving- and transmitting unit is arranged outside of the housing lid. This especially makes sense when the housing lid is largely manufactured of a metal material. The application of a metal material weakens the emitted signal of the receiving- and transmitting unit. For this reason, the receiving- and transmitting unit can be arranged outside of the housing lid and be electrically contacted via another opening with the interior of the housing lid, especially with the electronics of the housing lid and/or the communication interface of the housing lid.

In a preferred further development of the housing lid of the invention, it is provided that the housing lid is at least partially manufactured of a plastic. The application of a plastic assures a cost effective manufacturing of the housing lid with low material costs. Furthermore, the plastic can be so embodied that a corrosion resistance of the housing lid against aggressive environmental influences is assured.

In case the housing lid is manufactured predominantly of a metal material, a component of a plastic or a similar non-metallic material can be provided, behind which the receiving- and transmitting unit is arranged. Through this component, the signal of the receiving- and transmitting unit can leave, and signals transmitted from the external unit can enter.

In case the housing lid is predominantly manufactured of a plastic, the receiving- and transmitting unit can be integrated directly into the housing lid, especially into a wall of the housing lid.

Likewise, it can be provided to combine a metal material and a plastic. For example, a metal housing lid core can be provided, which is surrounded on its outwardly facing surface and on its inwardly facing surface on all sides by a plastic jacket. This combination provides, on the one hand, the mechanical stability of the metal material and, on the other hand, the corrosion resistant properties of the plastic material.

In an especially preferred embodiment of the housing lid of the invention, it is provided that the receiving- and transmitting unit is embodied to transmit and/or to receive field device relevant information via a wireless network protocol, especially WLAN, wireless HART, Bluetooth, Zigbee and/or NFC/RFID. In principle, all established wireless network protocols can be provided.

BRIEF DESCRIPTION OF THE DRAWINGS

The invention will now be explained in greater detail based on the appended drawing, the figures of which show as follows.

DETAILED DESCRIPTION

Figure 1:
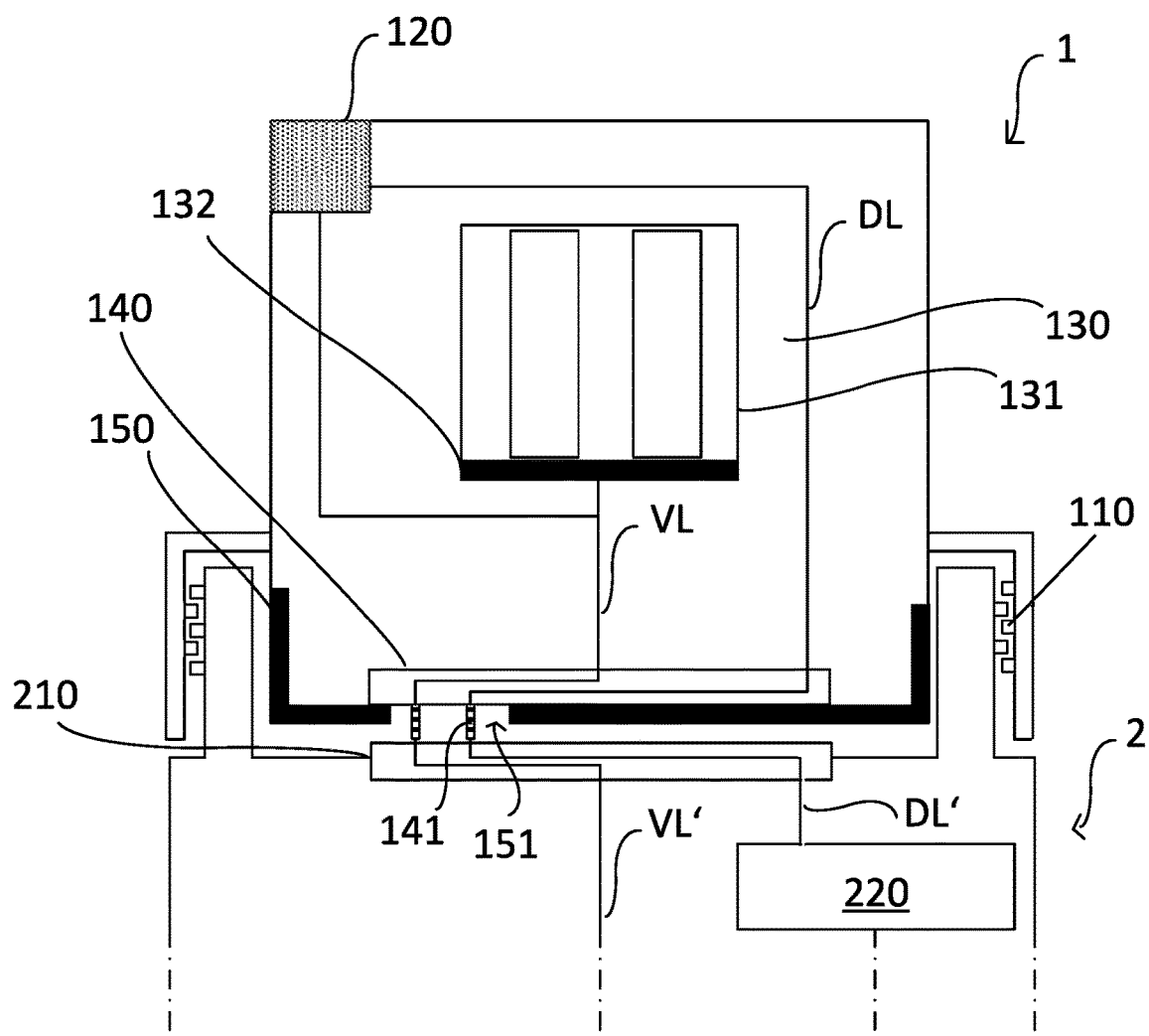
FIG. 1 shows a first example of an embodiment of the housing lid of the invention for use in an explosion-endangered environment.

FIG. 1 shows a first example of an embodiment of the housing lid 1 of the invention for use in an explosion-endangered environment. Housing lid 1 is manufactured of a metal material. Located in the interior of the housing lid 1 is a receiving- and transmitting unit 120, which is secured to the wall of the housing lid 1. Since metal weakens the signals sent from and received by the receiving- and transmitting unit 120, the subsection of the wall of the housing lid 1, where the receiving- and transmitting unit 120 is secured, contains a non-metallic component. This can be composed, for example, of a plastic. Alternatively, the receiving- and transmitting unit 120 can be arranged outside of the housing lid 1 and connected with the interior of the housing lid 1 via a cable, which is led through an opening in the wall of the housing lid 1.

The receiving- and transmitting unit 120 is embodied to transmit and/or to receive signals, and thus information, using a wireless network protocol, especially WLAN, wireless HART®, Bluetooth®, Zigbee® and/or NFC/RFID. In principle, all established wireless network protocols can be used.

For energy supply of the receiving- and transmitting unit 120, a battery unit 130 is located in the interior of the housing lid 1, which is in electrical contact with the receiving- and transmitting unit 120 via a supply line SL. Battery unit 130 is composed of a battery 131, which is held in a battery holder 132. It can alternatively be provided to use a battery 131 with solder contacts, for connection durably with the battery holder 132. Likewise, it can be provided to pot the battery 131 in the battery holder.

The receiving- and transmitting unit 120 and the battery unit 130 are connected via separate supply lines SL and data lines DL with a communication interface 140 located in the housing lid. This serves for connection with a corresponding communication interface 210 of a field device 2, onto which the housing lid 1 is screwed on.

By means of a closure element 150, the housing lid 1 is sealed on its end region facing the field device 2. Only an opening 151 is provided for contacting the communication interface 140 of the housing lid with the corresponding communication interface 210 of the field device 2. This contacting is, in this case, implemented via spring contact pins 141, which are mounted on the communication interface 140 of the housing lid 1 and protrude out from the housing lid through the opening 151. Alternatively, the electrical contacting occurs by means of plug contacts.

The closure element 150 in the embodiment of the housing lid 1 of the invention of FIG. 1 is embodied as a pot shaped element composed of a metal material. This is completely cast or potted with the housing lid 1, so that an opening of the housing lid 1 is not possible.

By means of a screw thread 110 located on the housing lid 1, the housing lid 1 is secured on the field device 2. For this, the conventional housing lid of the field device 2 is screwed off and replaced with the housing lid 1 of the invention. If the field device 2 has a two chamber housing, with a first and a second housing space, wherein the two housing spaces are sealed with separate housing lids, then the housing lid 1 of the invention can replace any conventional housing lid. The screw thread 110 can, in such case, be embodied either as an external thread or as an internal thread. Via a detent, for example, in the form of a lid claw, the housing lid 1 experiences an additional mechanical securement to the field device.

In such case, the communication interface 140 of the housing lid 1 is electrically connected with the corresponding communication interface 210 of the field device. Contacted to this corresponding communication interface 210 of the field device 2 are data lines DL' and supply lines SL' of the field device. Battery unit 130 can via the supply lines SL, SL', thus, also supply the field device 2 with electrical energy.

Provided in the field device 2 is an electronics 220. This serves for operating the receiving- and transmitting unit 120 and is connected with such via data lines DL, DL'. The electronics 220 can be supplied with energy either by the field device 2 or by the battery unit 130 of the housing lid 1.

Because of the casting or potting of the housing lid 1 with the closure element 150, the housing lid 1 is suitable for use in an explosion endangered environment. If the battery unit 130 is worn-out, then the entire housing lid 1 can be replaced. This replacement can likewise be performed in an explosion-endangered environment, a feature that is not possible due to the danger of arcing with conventional radio adapters for field devices 2, whose housing must be opened and the battery replaced.

With the aid of the housing lid 1 of the invention, it is possible to equip a field device 2 in such a manner that it can be used for wireless communication, thus for receiving and sending of information, using an external unit (not shown). The external unit can be, for example, a wireless router, for example, in the form of a gateway. Alternatively, the external unit can be another field device 2 or a computer unit. The computer unit, which, for example, is embodied for configuring and/or parametering the field device 2 by means of wireless communication, can be, for example, a stationary computer unit, for example, a service PC, or even a mobile computer unit, especially a mobile end device, such as a smart phone or a tablet.

The transmitted information can especially be information produced by the field device 2, such as, for example, process measured values or diagnostic data. The received information is especially control commands or configuration/parametering commands.

Figure 2:
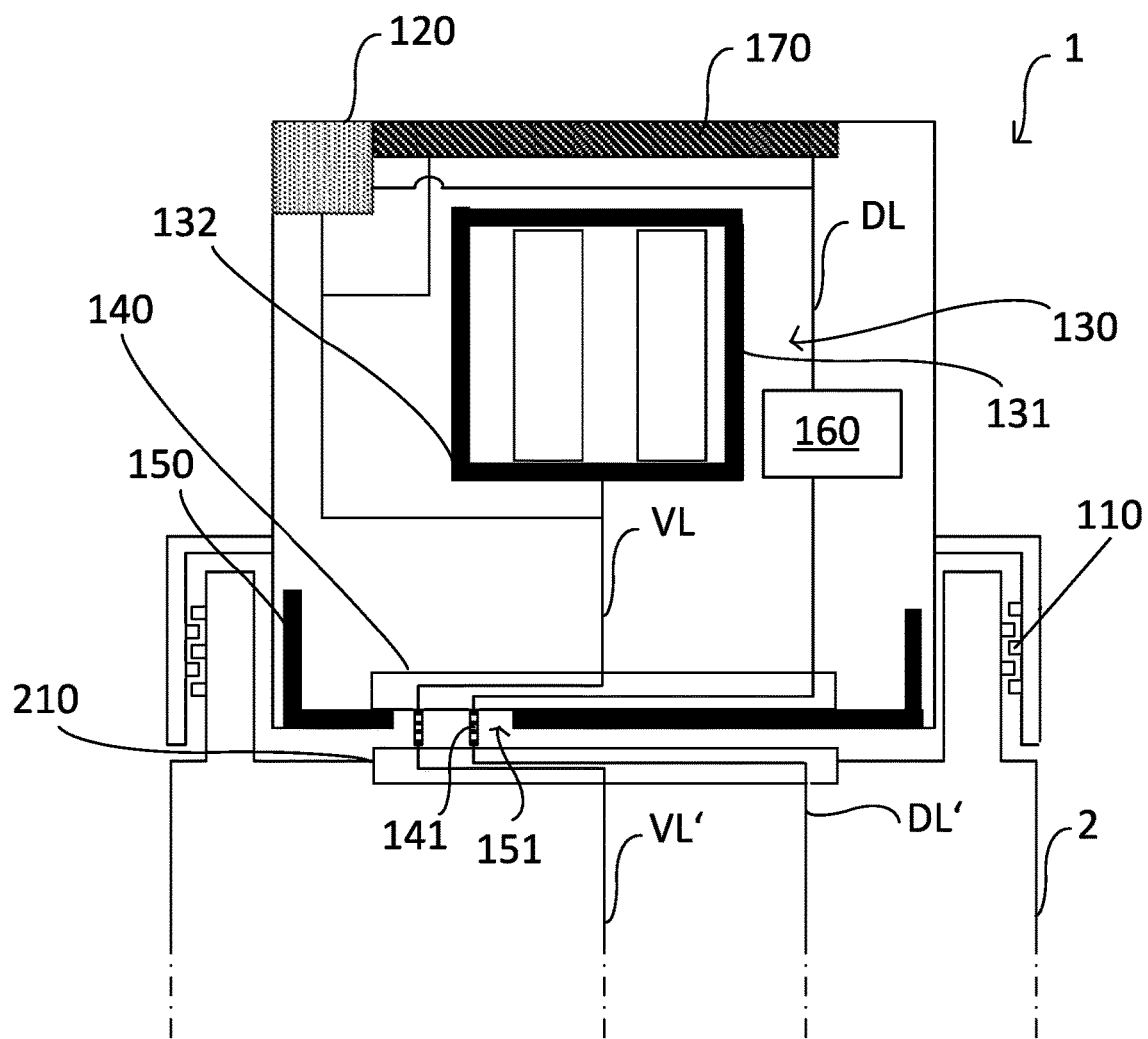
FIG. 2 shows a second example of an embodiment of the housing lid of the invention.

FIG. 2 shows a second, alternative example of an embodiment of the housing lid of the invention. In contrast to the housing lid 1 shown in FIG. 1, the housing lid shown in FIG. 2 is composed of a plastic.

The closure element 150 is, in such case, only mechanically connected with the housing lid 1, for example, via a snap fit mechanism. Housing lid 1 can, consequently, be opened, in contrast to the housing lid 1 shown in FIG. 1. This variant is suitable especially for use in a non-explosion-endangered environment.

In addition to the components 120, 130, 140 of the embodiment of the housing lid 1 shown in FIG. 1, the embodiment of FIG. 2 has an interaction/display element 170 in the housing lid 1. This serves for display of information to be transmitted or received information, especially using a display. Also other field device relevant information can be displayed. In order to make the interaction/display element 170 in the housing lid 1 visible, the housing lid can have a viewing glass window integrated in its end region facing to the outside of the field device. Furthermore, the interaction/display element 170 serves for interacting with the field device 2, especially via a touch sensitive display or via an input element such as an array of buttons or keys. The interaction/display element 170 is connected with the data line DL, same as the receiving- and transmitting unit 120. The energy supply of the interaction/display element 170 occurs via the field device 2 or via the battery unit 130 of the housing lid, wherein in such case the battery 131 is potted with the battery holder 132.

Furthermore in FIG. 2, an electronics 160 is located in the housing lid. The electronics 160 serves for converting the information to be transmitted to conform to a wireless protocol and/or for the evaluation and forwarding of information received via the receiving- and transmitting unit 120 to the field device 2.

Besides the examples of embodiments of the housing lid 1 of the invention shown in FIGS. 1 and 2, a large number of additional embodiments are possible based on combinations of the components. Of course, the invention is applicable to any variant of the described components and features of the housing lid 1 and is not limited to the examples used in these embodiments.

The invention claimed is:

1. A housing lid for a field device, comprising:
   a screw thread embodied and arranged on the housing lid such that the housing lid is securable to the field device by the screw thread and a complementary screw thread of the field device;
   a receiving and transmitting unit embodied to receive wirelessly information produced by an external unit and to transmit wirelessly information produced by the field device to the external unit;
   a battery unit embodied to supply the receiving and transmitting unit the field device with electrical energy; and
   a communication interface in electrical contact with the battery unit and the receiving and transmitting unit, and embodied to connect with a corresponding communication interface of the field device,
   wherein the battery unit and the receiving and transmitting unit are attached to or supported by the housing lid when the housing lid is not in threaded engagement with the field device,
   wherein the communication interface of the housing lid is further embodied to exchange information between the receiving and transmitting unit and the field device via the communication interface and the corresponding communication interface of the field device and to transfer electrical energy between the communication interface of the housing lid and the corresponding communication interface of the field device;
   wherein electrical contacting of the communication interface of the housing lid and the communication interface of the field device is formed during a threading engagement of the housing lid and the field device.

2. The housing lid as claimed in claim 1, further comprising:
   a closure component that closes the housing lid at an end region of the housing lid facing the field device, the closure component having an opening via which the communication interface of the housing lid is electrically contactable with the corresponding communication interface of the field device.

3. The housing lid as claimed in claim 2, wherein the closure component is cast or potted with the housing lid such that the housing lid is suitable for use in an explosion endangered environment.

4. The housing lid as claimed in claim 2, wherein the communication interface of the housing lid or the corresponding communication interface of the field device includes at least one spring contact or plug contact for contacting the communication interface of the housing lid with the corresponding communication interface of the field device, which contact is led through the opening of the closure component and protrudes out from the closure component.

5. The housing lid as claimed in claim 2, further comprising:

a cable connection that is led through the opening of the closure component and that connects the communication interface of the housing lid with the communication interface of the field device.

6. The housing lid as claimed in claim 1, wherein the battery unit includes a battery and a battery holder and wherein the battery and the battery holder are potted.

7. The housing lid as claimed in claim 1, further comprising:
an electronics configured to control the receiving and transmitting unit, wherein the electronics is supplied with electrical energy from the battery unit or from the field device and is in electrical contact with the corresponding communication interface of the field device and with the receiving and transmitting unit.

8. The housing lid as claimed in claim 1, wherein an electronics for control of the receiving and transmitting unit is provided in the field device, and the electronics is supplied with electrical energy from the battery unit or from the field device and is in electrical contact with the corresponding communication interface of the field device.

9. The housing lid as claimed in claim 1, further comprising:
an interaction/display element disposed in the housing lid for interacting with the field device and/or for display of field device relevant information, wherein the interaction/display element is supplied with electrical energy from the battery unit or from the field device.

10. The housing lid as claimed in claim 1, wherein the housing lid is manufactured at least partially of a metal material.

11. The housing lid as claimed in claim 10, wherein the receiving and transmitting unit is arranged outside of the housing lid.

12. The housing lid as claimed in claim 1, wherein the housing lid is manufactured at least partially of plastic.

13. The housing lid as claimed in claim 1, wherein the receiving and transmitting unit is embodied to transmit and to receive field device relevant information via a wireless network protocol, especially WLAN, wireless HART, Bluetooth, Zigbee and/or NFC/RFID.

* * * * *